United States Patent [19]

Sato

[11] 4,259,138

[45] Mar. 31, 1981

[54] CORRECTION LABEL APPLYING DEVICE FOR A LABEL PRINTING MACHINE

[75] Inventor: Yo Sato, Tokyo, Japan

[73] Assignee: Kabushiki Kaisha Sato Kenkyusho, Tokyo, Japan

[21] Appl. No.: 32,378

[22] Filed: Apr. 23, 1979

[30] Foreign Application Priority Data

Apr. 27, 1978 [JP] Japan ................................ 53/49286
Mar. 20, 1979 [JP] Japan ................................ 54/59630

[51] Int. Cl.$^3$ ........................ B32B 31/00; B32B 31/04; B65H 9/16; B41F 13/64

[52] U.S. Cl. .................................... 156/363; 156/543; 156/DIG. 27; 271/253; 101/233; 101/242

[58] Field of Search ............... 156/384, DIG. 27, 277, 156/543, 363; 101/233, 234, 235, 239, 241, 242, 68, 287; 346/83, 84; 271/245, 253, 254; 355/75

[56] References Cited

U.S. PATENT DOCUMENTS

| | | | |
|---|---|---|---|
| 2,265,234 | 12/1941 | Jensen | 271/255 |
| 3,355,344 | 11/1967 | Brody et al. | 156/384 |
| 3,762,317 | 11/1973 | Hamisch, Sr. | 101/68 |
| 4,113,544 | 9/1978 | Sato | 156/384 |
| 4,149,462 | 4/1979 | Sato | 156/384 |

*Primary Examiner*—William A. Powell
*Assistant Examiner*—L. Falasco
*Attorney, Agent, or Firm*—Ostrolenk, Faber, Gerb & Soffen

[57] ABSTRACT

The disclosure concerns a correction label applying device for a portable label printing machine, which is used to correct the characters printed on price tags. The correction label applying device is detachably secured to the body of the portable label printing machine. The price tag holding device of the label applying device is provided with adjusting means in which the positions of stoppers which receive the tip edge portion of an inserted price tag and the positions of a pair of guides which guide both the side edges of the inserted price tag can be changed. A leaf spring gives elastic force to the price tag holder.

19 Claims, 9 Drawing Figures

CORRECTION LABEL APPLYING DEVICE FOR A LABEL PRINTING MACHINE

BACKGROUND OF THE INVENTION

1. Field of the Invention

This invention relates to a correction label applying device for a label printing machine, which is employed when the characters such as letters, figures and symbols that are printed on price tags or tickets must be corrected.

2. Description of the Prior Art

Conventionally, when the characters indicating the price of a commodity that are printed on a price tag are to be corrected, a label piece, which is printed with corrected characters, is stuck onto a predetermined spot on the tag by using a portable label printing machine. However, it has been very difficult to attach the correction label precisely over the part to be corrected. Therefore,. such operation took considerable time and the finished appearance of the label was not satisfactory.

SUMMARY OF THE INVENTION

It is, therefore, the principal object of the present invention to apply correction labels, using a device that avoids the above described disadvantages of the conventional art.

Another object of the present invention is to provide a correction label applying device for a portable label printing machine, which device is able to attach correction labels to predetermined points on price tags, or the like.

A further object of the present invention is to provide a correction label applying device for a portable label printing machine, which device is provided with adjusting means to change the attaching position of the correction labels.

Still a further object of the present invention is to provide a correction label applying device which is easy and smooth in handling and accurate and reliable in operation.

In accordance with the present invention, the correction label applying device is detachably secured to the machine body of a portable label printing machine. The applying device includes a price tag holding device which is comprised of a price tag holder and an adjusting member which is adjustably attached to the price tag holder. Adjusting means, in the form of at least one adjustable position stopper, receives the tip edge portion of an inserted price tag to control the depth of its insertion into the price tag holder. Furthermore, a pair of side guides guide both side edges of the inserted price tag. The relative positions of the guides can be changed for different width tags or for varying the spot across the width of a tag to receive a correction label. A leaf spring biases the correction label applying device away from the body of the labeler and from the label applying element on the labeler, and the device is movable in opposition to the spring toward the applying element to have the correction label applied thereby.

BRIEF DESCRIPTION OF THE DRAWINGS

Other objects and features of the present invention will become apparent from the following description taken in connection with the accompanying drawings, in which:

FIG. 7 (B) is a cross-sectional view taken on the line B—B in FIG. 7 (A);

DESCRIPTION OF THE PREFERRED EMBODIMENTS

Referring to the accompanying drawings, embodiments of the present invention are now described.

Figure 1:
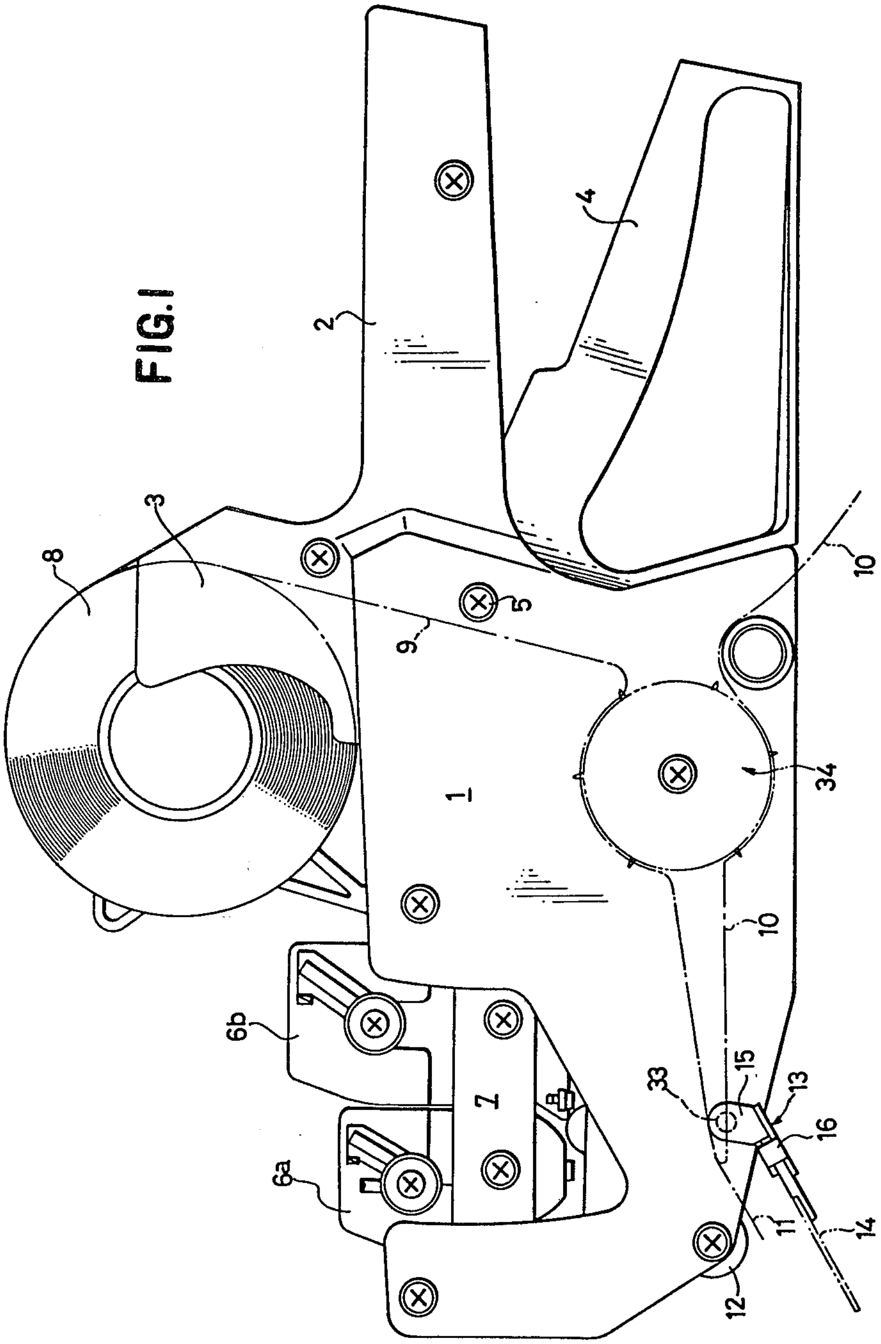
FIG. 1 is a side elevational view of a label printing machine which is provided with an emodiment of a correction price tag holding device of the present invention.

Referring to FIG. 1, the portable label printing machine comprises a machine frame 1 which is integrally provided with a hand grip 2 that extends rearwardly (to the right in FIG. 1) from the rear side wall of the machine frame 1. A label holder 3 is integrally formed on the upper side of the machine frame 1. It supports a rolled label strip 8. Beneath the hand grip 2, a hand lever 4 is pivotally secured to the machine frame 1 at a pivot shaft 5. At the front (left) portion of the hand lever 4, yoke arms 7 are integrally formed. They carry the printing heads *6a* and *6b*.

As in known label printing machines, upon repeated squeezing and the releasing of the hand lever 4, the label pieces of the tape-like label strip 9 are paid out from the rolled label strip and are printed in series by the printing heads *6a* and/or *6b* as the label strip 9 is intermittently advanced through the machine frame 1 by means of a label feeding device 34. Following the imprinting, the backing paper 10 is peeled from the label strip 9 and the printed label pieces 11 that have been separated from the backing paper 10 are delivered in series to the underside of a label applying roller 12.

Figure 3:
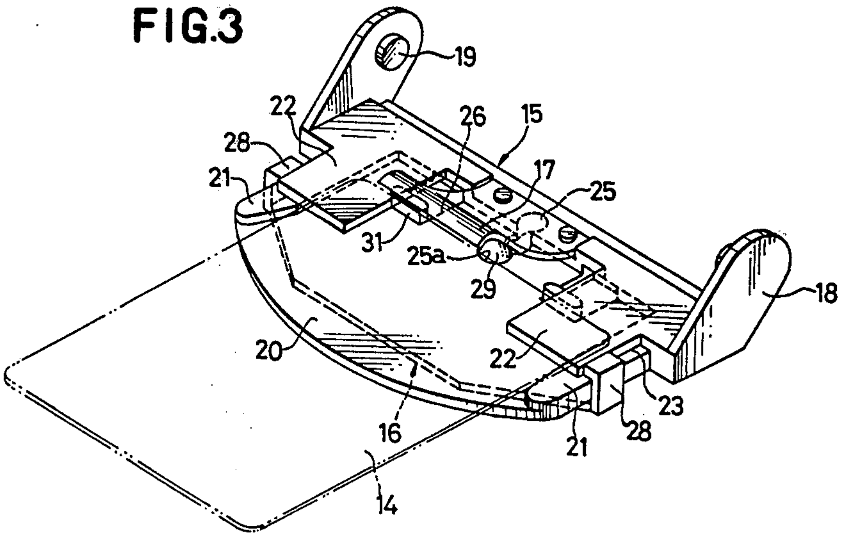
FIG. 3 is a perspective view of the price tag holding device of the present invention.
Figure 5:
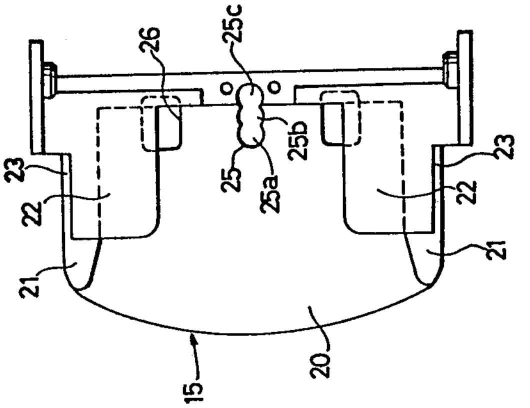
FIG. 5 is a plan view of the price tag holder of the device.
Figure 4:
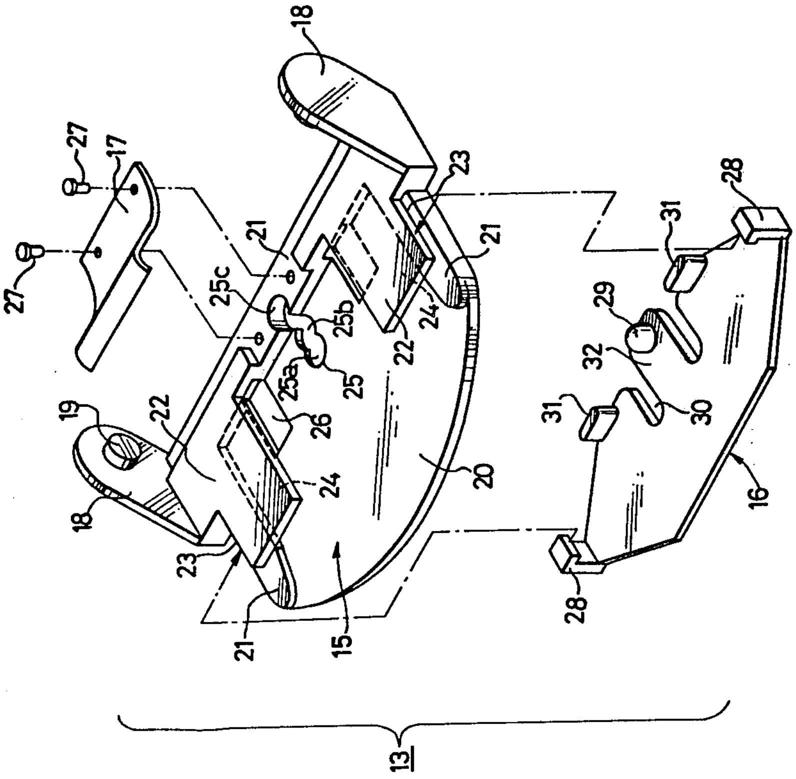
FIG. 4 is an exploded perspective view of the same device.

The price tag holding device included in the correction label applying device of the present invention is attached at the lower front portion of the label printing machine near the outlet for the printed label pieces 11. As shown in FIGS. 3 and 4, the first embodiment of a price tag holding device 13 is comprised of a price tag holder 15 which supports a price tag 14, an adjusting member 16 which controls the holding position of the price tag 14, and a leaf spring 17 which provides elastic force to the price tag holder 15.

The price tag holder 15 is generally U-shaped. It includes a pair of side plates 18. On each opposed inside wall of the side plates 18, a respective engaging projection 19 is formed. The enlarged upper surface of the bottom plate 20 of the price tag holder 15 is formed with a U-shaped guide section 21 with legs that lie along both sides of the plate 20 and with a joining web that lies along the rear edge of the price tag holder 15. A pair of price tag supporting plates 22 are formed above the upper surface of the guide section 21.

In the front end portions of the tag supporting plates 22 both outside edges are retracted or narrowed to some extent, as compared with the side edges of the guide section 21. This defines the attaching portions 23 for the adjusting member 16. The opposed inside edges of the tag supporting plates 22 extend inward past the inward edges of the side arms of the guide section 21, above the bottom plate 20, thereby forming tag inserting spaces 24 between the tag supporting plates 22 and the bottom plate 20.

An indexing hole 25 is defined through the rear middle portion of the bottom plate 20 and the guide section 21. The indexing hole 25 is comprised of a row of three circular holes 25*a*, 25*b* and 25*c*, which communicate with each other. A pair of stopper openings 26 are defined on both sides of the indexing hole 25 through both the bottom plate 20 and the guide section 21. The upper sides in the rear end portions of the stopper openings 26 are covered by the tag supporting plates 22, whereby the stoppers close off further insertion of the tag under plates 22.

In the space between the opposed sides of the rear ends of the tag supporting plates 22 and on the upper surface of the guide section 21, the leaf spring 17 is attached by means of pins 27.

The adjusting member 16 has vertically upwardly projecting, L-shaped hooks 28 on both side edges thereof. An elastic piece 32 extends rearwardly of the member 16 and has an upstanding hemispherical indexing projection 29 formed on it. In the rear end portion of the adjusting member 16, a pair of recesses 30 are formed on both sides of the elastic piece 32. Stoppers 31 are attached at the rear edges on both sides of the recesses 30.

The price tag holder 15 and the adjusting member 16 may be made of an elastic material, such as synthetic plastics.

As shown in FIG. 3, the adjusting member 16 can be slidably attached to the price tag holder 15 by bringing the L-shaped hooks 28 into engagement with the attaching portions 23 of the price tag holder 15. In the attached state shown in FIG. 3, the indexing projection 29 of the adjusting member 16 is received in the front end circular hole 25*a* of the indexing hole 25 of the price tag holder 15, and the stoppers 31 are received within the stopper openings 26. When the positions of the stoppers 31 are changed, the adjusting member 16 is pushed rearward. The hooks 28 are slid rearward on the attaching portions 23, the elastic piece 32 is bent downwardly and the indexing projection 29 is disengaged from the circular hole 25*a* and is brought into engagement with another circular hole 25*b* or 25*c*, whereby indexing or positioning of the adjusting member 16 can be accomplished. Thus, the positions of the stoppers 31 can be determined by sliding the adjusting member 16 in the forward or rearward directions.

To pivotally and detachably secure the price tag holding device 13 to the machine body of the label printing machine, the side plates 18 of the price tag holder 15 are bent outward and the engaging projections 19 of the side plates 18 are fitted into the circular engaging recesses 33 that are formed in both side walls of the machine frame 1. Of course, the present invention is not restricted to the above manner and location of attaching price tag holding devices to the label printing machine. For example, it may be possible to attach the correction label applying device to a part of the bottom cover or to the inside wall of the machine frame of the label printing machine.

The operation of the first embodiment of the device of the present invention is now described.

Price indicating pieces, such as tags and tickets on commodities, are somewhat stiff and are comprised of thick paper, cardboard, platic etc. The tags are generally printed with several lines of information, such as prices of the commodities, lot numbers and so forth. If some of these indications must be corrected, the price tag holding device 13 of the present invention is used, after the device 13 has been attached to a label printing machine as shown in FIG. 1. Then the desired types to be imprinted on the correction label are set to their printing positions by manipulating the printing heads 6*a* and 6*b*. As shown in FIG. 3, the price tag 14 to be corrected is inserted into the space between the bottom plate 20 and the tag supporting plates 22 of the price tag holder 15 from the front side of the holding device 13 along the guide sections 21. The rearward edge of the price tag 14 comes into contact with the stoppers 31 of the adjusting member 16 and further insertion of the price tag 14 is stopped.

Figure 2:
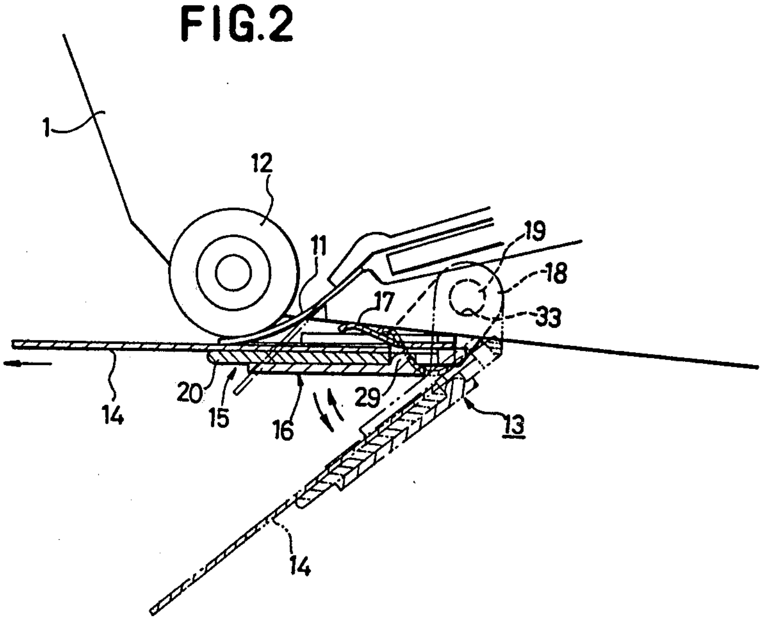
FIG. 2 is a vertical cross-sectional view of the device of the present invention showing the state of application of a correction label to a price tag.

When the hand lever 4 of the label printing machine is squeezed and released once, the correction characters are printed on the label piece 11. The label piece 11 is next peeled from the backing paper 10 in the label printing machine. Then the label piece is fed out under the applying roller 12. The front end portion of the label printing machine is pressed on a table or the price tag holding device 13 is pushed up with a finger, thereby turning the price tag holding device 13 clockwise against the force of the leaf spring 17, as shown in FIG. 2, and pressing the price tag holding device 13 toward the applying roller 12. Therefore, since the price tag 14 and the label piece 11 are pushed together by the applying roller 12 above and the bottom plate 20 of the price tag holder below, the front end of the label piece 11 is stuck to the predetermined point of the price tag 14. After that, as the price tag 14 is pulled forward out of the device 13, the rear part of the label piece 11 is also applied to the price tag 14 by the pressure of the applying roller 12, thereby finishing correction of the printed characters on the price tag 14 (see FIG. 6(A)).

Figure 6:
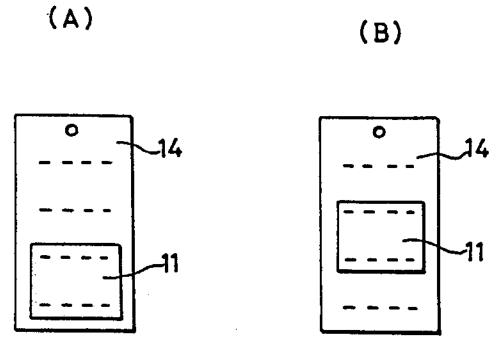
FIGS. 6 (A) and (B) are plan view of price tags to which correction labels have been applied.

To change the position of the correction label piece 11, as shown in FIG. 6 (B), the adjusting member 16 is slid forwardly or rearwardly relative to the price tag holder 15 and the engaging position between the indexing projection 29 and the indexing hole 25 is changed. This adjusts the positions of the stoppers 31 so that the supporting position of the price tag 14 can be shifted.

Because the label printing machine in the above described embodiment is provided with two printing heads, two lines of printed characters can be corrected simultaneously. However, when one line or three lines of characters are to be corrected, a label printing machine respectively having one or three printing heads may be employed.

Figure 7:
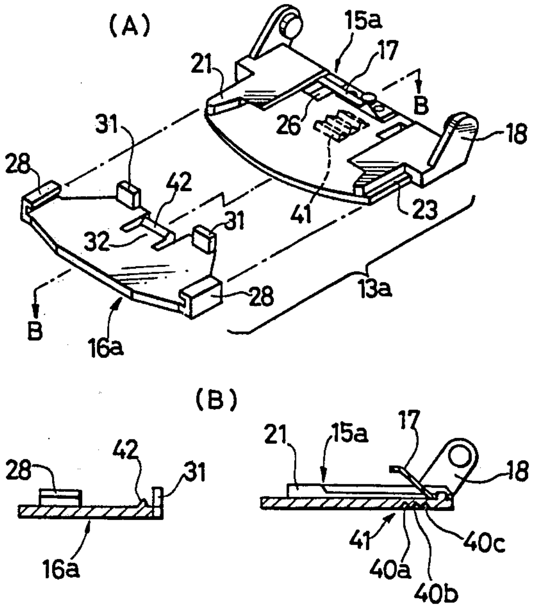
FIG. 7 (A) is an exploded perspective view of a second embodiment of a correction price tag holding device of the present invention.

The second embodiment of the present invention will be described with reference to FIG. 7. The same parts as in the first embodiment are indicated by the same numerals in FIG. 7. The price tag holding device 13*a* in this embodiment has almost the same structure as the device of the first embodiment. In the second embodiment, the positioning section of the adjusting member 16*a* is somewhat different in relation to the price tag holder 15*a*. More particularly, in place of the indexing hole 25, jagged indexing recesses 41 comprising recesses 40*a*, 40*b* and 40*c* are formed at the rear side of the price tag holder 15*a*. The adjusting member 16*a* is provided with a complementary indexing projection 42 at the tip end of its elastic piece 32. When the adjusting member 16*a* is attached to the price tag holder 15*a*, the indexing projection 42 is brought into engagement with one of the recesses 40*a*, 40*b* and 40*c* of the indexing recesses 41, thereby adjusting the position of the member 16*a*. When the positions of the stoppers 31 to receive the front edge of a inserted price tag are changed, the whole adjusting member 16*a* is slid relative to the price tag holder 15*a* so as to bring the indexing projection 42 into engagemet with another one of the recesses 40*a*, 40*b* and 40*c*.

Figure 8:
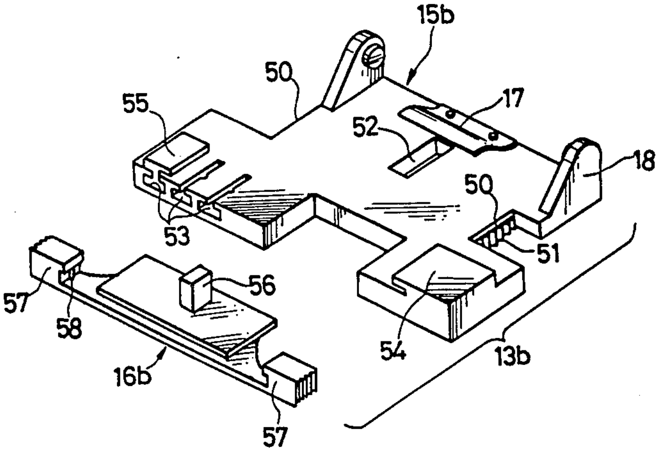
FIG. 8 is an exploded perspective view of a third embodiment of a device of the present invention.

The third embodiment of the invention is now described with reference to FIG. 8. Here also, the same parts as in the first embodiment are indicated by the same numerals in FIG. 8. In this embodiment, the supporting position of the tag can be varied in both the longitudinal direction and the lateral direction of the price tag. In the lower halves of the attaching portions 50 that are formed on both sides of the price tag holder 15*b*, jagged positioning sections 51 are provided. A through hole 52 is defined in the middle portion of the price tag holder 15. A row of parallel attaching groves 53, each in the shape of an inverted T, are formed in the upper front portion on one side of the price tag holder 15*b*. The attaching grooves 53 each extend in the longitudinal direction and are laid laterally in side by side relation with each other. A fixed guide 54 is formed on the other side of the price tag 15*b*. A guide piece 55, which is H-shaped in cross-section, is attached in one of the attaching grooves 53. Thus the price tag is guided by the fixed guide 54 and the adjustably positioned guide piece 55.

The adjusting member 16*b* is vertically provided with a stopper 56 in the rear middle portion thereof. The adjusting member 16*b* is further provided with hooks 57 on both side ends. An indexing rib 58 is defined in the recess which is formed in each inside wall of the above hooks 57.

The operation of the third embodiment is now described.

When the adjusting member 16*b* is attached to the price tag holder 15*b*, the stopper 56 is fitted into the through hole 52 and the hooks 57 are brought into engagement with the attaching portions 50. During this assembly, each indexing projection 58 is fitted to a selected recess formed in each jagged positioning section 15. If the attached position thereof is to be changed, the adjusting member 16*b* may be slid forward or rearward in like manner as in the foregoing first and second embodiments.

Figure 9:
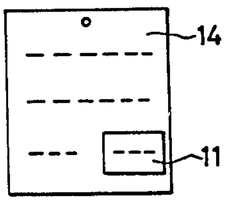
FIG. 9 is a plan view of a price tag to which a correction label piece has been applied by the device shown in FIG. 8.

To apply a correction label to a price tag having a different width, it is also possible to receive the different size price tag by shifting the guide piece 55 to another one of the attaching grooves 53 selected in accordance with the width of the price tag. As shown in FIG. 9, the correction label 11 can be attached not only centrally of the price tag 14 but also to one side of the center of the price tag 14, whereby only one side portion of a line of printed characters can be corrected.

Furthermore, variable guide members comprised of a plurality of attaching grooves 53 and a guide piece 55 may also be formed on the other side of the price tag holder 15*b* in place of the fixed guide 54. In this way, the attaching position of correction labels 11 can be changed for price tags of the same width, by properly selecting the positions of both the guide pieces 55.

Summarizing the features of the device of the present invention, the price tag holding device can be detachably secured to a body portion of the portable label printing machine. Further, the device is provided with adjusting means comprising a stopper that receives an edge portion of an inserted price tag and a pair of guides to guide both of the side edges of the price tag. These can be changed in their positions, so that the holding positions of the price tag can be freely adjusted in the longitudinal and lateral directions. At the same time, price tags having different widths can also be treated. Accordingly, it is possible to always attach correction labels accurately and reliably at the desired positions of the price tags. Furthermore, the correction of price tags is carried out quite easily and smoothly.

Although the present invention has been described in connection with preferred embodiments thereof, many variations and modifications will now become apparent to those skilled in the art. It is preferred, therefore, that the present invention be limited not by the specific disclosure herein but only by the appended claims.

I claim:

1. A correction label applying device for a label applying machine for applying a correction label to a price tag, or the like, said device comprising:

a label applying machine, said label applying machine comprising a label applying element and delivery means for delivering a label to said applying element;

said correction label applying device comprising:

a tag holder having a guide for receiving a tag;

an adjusting member supported adjacent to said tag holder and including a tag stopper connected thereto said support having index openings and corresponding extentions of said adjusting member engageable with said adjusting member, engageable with said openings; said tag stopper extending into said guide for blocking further insertion of a tag into said guide beyond said stopper;

said correction label applying device being connected to said label applying machine near said applying element, such that said guide holds a tag at said applying element for having a label applied to the tag.

2. The correction label applying device of claim 1, further comprising cooperating means on said guide and said adjusting member for selectively adjusting the position of said stopper with respect to the position of said guide.

3. The correction label applying device of claim 2, wherein said cooperating means comprises an indexing projection on one of said adjusting member and said guide and comprises a series of indexing holes on the other of said adjusting member and said guide; means for resiliently holding said projection in a selected said indexing hole.

4. The correction label applying device of claim 2, wherein said cooperating means comprises an indexing projection on one of said adjusting member and said guide and comprises a series of indexing indentations on the other of said adjusting member and said guide; means for resilienty holding said projection in a selected said indexing indentation.

5. The correction label applying device of claim 1, wherein said guide includes a side edge guide for a side edge of a tag being inserted into said guide.

6. The correction label applying device of claim 1, wherein said label applying machine includes a label imprinter, and said delivery means delivers a printed label to said applying element for enabling said applying element to cooperate with said guide to apply a label to a tag on said guide.

7. The correction label applying device of claim 1, wherein said tag holder includes a tag supporting surface movable to be in opposition to said applying element, such that said applying element will press a label to a tag on said tag holder, when said tag supportiing surface is moved to said applying element.

8. The correction label applying device of claim 7, wherein said device is pivotally attached to said machine for enabling said guide surface to pivot toward and away from said applying element.

9. The correction label applying device of claim 7, wherein said adjusting member comprises a support located beneath said supporting surface, on the side of said supporting surface away from said applying element; said stopper being carried on said support and extending up past said supporting surface.

10. The correction label applying device of claim 9, further comprising cooperating means on said guide and said adjusting member for selectively adjusting the position of said stopper with respect to the position of said guide.

11. The correction label applying device of claim 10, wherein said cooperating means comprises an indexing projection on one of said adjusting member and said guide and comprises a series of indexing holes on the other of said adjusting member and said guide, means for resiliently holding said projection in a selected said indexing hole.

12. The correction label applying device of claim 10, wherein said cooperating means comprises an indexing projection on one of said adjusting member and said guide and comprises a series of indexing indentations on the other of said adjusting member and said guide, means for resiliently holding said projection in a selected said indexing indentation.

13. The correction label applying device of claim 7, further comprising biasing means for normally urging said supporting surface away from said applying element and for enabling said supporting surface to be moved to said applying element.

14. The correction label applying device of claim 13, wherein said device is pivotally attached to said machine for enabling said tag supporting surface of said tag holder to pivot toward and away from said applying element.

15. The correction label applying device of claim 5, wherein said side edge guide is adjustable in position across said guide for receiving different width tags and for enabling selective positioning of a tag across said guide.

16. The correction label applying device of claim 15, further comprising a second side edge guide on said tag guide in opposition to the first said side edge guide, thereby for defining a widthwise predetermined gap between said side edge guide for receiving a tag between said side edge guides.

17. A corrrection label device for a label applying machine for applying a correction label to a price tag, or the like, comprising:

a label applying machine, said label applying machine comprising a label applying element and delivery means for delivering a label to said applying element;

said correction label applying device comprising a tag holder having a guide for receiving a tab; said guide including a first side edge guide for one side edge of a tag being inserted into said guide; said first side edge guide being adjustable in position across said guide for receiving different width tags and for enabling selective positioning of a tag across said guide having index openings and corresponding extentions engageable with said opening;

said correction label applying device being connected to said label applying machine near said applying element, such that said guide holds a tag at said applying element for having a label applied to the tag;

said tag holder including a tag supporting surface movable to be in opposition to said applying element, such that said applying element will press a label to a tag on said tag holder, when said tag supporting surface is moved to said applying element.

18. The correction label applying device of claim 17, further comprising a second side edge guide on said tag guide in opposition to the first said side edge guide, thereby for defining a widthwise predetermined gap between said first and said second side edge guides for receiving a tag therebetween.

19. The correction label applying device of claim 18, wherein said device is pivotally attached to said machine for enabling said guide support to pivot toward and away from said applying element.

* * * * *